United States Patent
Jain et al.

(10) Patent No.: US 12,333,445 B2
(45) Date of Patent: Jun. 17, 2025

(54) SYSTEM FOR GENERATING MULTIPLE SIMILAR QUESTIONS AND THEIR SOLUTIONS AND METHOD THEREOF

(71) Applicant: INDIAVIDUAL LEARNING LIMITED, Karnatka (IN)

(72) Inventors: Peeyush Jain, Bangalore (IN); Rajdeep Singh, Bangalore (IN); Keyur Faldu, Bangalore (IN); Aditi Avasthi, Bangalore (IN)

(73) Assignee: INDIAVIDUAL LEARNING LIMITED, Bangalore (IN)

( * ) Notice: Subject to any disclaimer, the term of this patent is extended or adjusted under 35 U.S.C. 154(b) by 1020 days.

(21) Appl. No.: 17/367,088

(22) Filed: Jul. 2, 2021

(65) Prior Publication Data
US 2022/0004893 A1 Jan. 6, 2022

(30) Foreign Application Priority Data
Jul. 3, 2020 (IN) .............................. 202041023357

(51) Int. Cl.
*G06N 5/025* (2023.01)
*G06F 40/186* (2020.01)
(Continued)

(52) U.S. Cl.
CPC ........... *G06N 5/025* (2013.01); *G06F 40/186* (2020.01); *G06F 40/253* (2020.01); *G06F 40/30* (2020.01)

(58) Field of Classification Search
CPC .. G06F 16/00; G06F 16/3329; G06F 16/3344; G06F 16/367; G06F 16/35;
(Continued)

(56) References Cited

U.S. PATENT DOCUMENTS

| 6,067,538 A | 5/2000 | Zorba et al. |
| 10,854,099 B2 | 12/2020 | Faldu |

(Continued)

FOREIGN PATENT DOCUMENTS

| CN | 107451230 A | * 12/2017 |
| WO | 2012/160567 A1 | 11/2012 |

OTHER PUBLICATIONS

Qiu, Y., Wang, Y., Jin, X. and Zhang, K., 2020, January. Stepwise reasoning for multi-relation question answering over knowledge graph with weak supervision. In Proceedings of the 13th international conference on web search and data mining (pp. 474-482). (Year: 2020).*

(Continued)

*Primary Examiner* — Daniel C Washburn
*Assistant Examiner* — Sean E Serraguard
(74) *Attorney, Agent, or Firm* — Maschoff Brennan

(57) ABSTRACT

A system for generating at least a question, similar to a given question and generating their step-by-step solution is disclosed. The system includes a template creation module for creating a template representing the given question, wherein the template is created by implementing NLP techniques and performing steps of identification of one or more entities and recognition of relationships between them, identification of one or more attributes of each of the one or more entities, and identification of one or more values of each of the identified attributes. The system includes a similar question generation module for generating at least one question similar to the given question, using the template created and by replacing at least one value of at least one attribute in the (Continued)

template. The system also includes a solution generation module for generating the step-by-step solution for the given question and the at least one similar question.

17 Claims, 16 Drawing Sheets

(51) Int. Cl.
  *G06F 40/253* (2020.01)
  *G06F 40/30* (2020.01)
(58) Field of Classification Search
  CPC ............... G06F 16/90332; G06F 17/00; G06F 17/2785; G06F 40/00; G06F 40/30; G06F 40/295; G06F 40/35; G06F 40/289; G06F 40/284; G06F 40/186; G06F 40/279; G06F 40/205; G06F 40/211; G06F 40/216; G06F 40/253; G06N 3/00; G06N 3/08; G06N 3/045; G06N 3/044; G06N 5/00; G06N 5/02; G06N 5/04; G06N 5/022; G06N 5/025; G10L 15/00; G10L 15/22; G10L 15/26
  See application file for complete search history.

(56) References Cited

U.S. PATENT DOCUMENTS

| | | | |
|---|---|---|---|
| 2016/0019812 A1* | 1/2016 | Barkan | G09B 7/00 434/322 |
| 2018/0096619 A1* | 4/2018 | Fuka | G09B 7/02 |
| 2018/0293302 A1* | 10/2018 | Ko | G06F 40/295 |
| 2020/0311152 A1 | 10/2020 | Fladu | |
| 2020/0312178 A1 | 10/2020 | Faldu | |
| 2020/0312179 A1 | 10/2020 | Desai | |
| 2021/0149900 A1* | 5/2021 | Kim | G06F 16/3344 |
| 2021/0165791 A1* | 6/2021 | Kim | G06N 3/044 |

OTHER PUBLICATIONS

IN Patent Examination Report dated Feb. 27, 2023 as received in Application No. 202041023357.
Donda, Chintan, et al. "A framework for predicting, interpreting, and improving Learning Outcomes." arXiv preprint arXiv:2010.02629 (Oct. 13, 2020).
Dhavala, Soma, et al. "Auto Generation of Diagnostic Assessments and Their Quality Evaluation." International Educational Data Mining Society (Jul. 10, 2020).

* cited by examiner

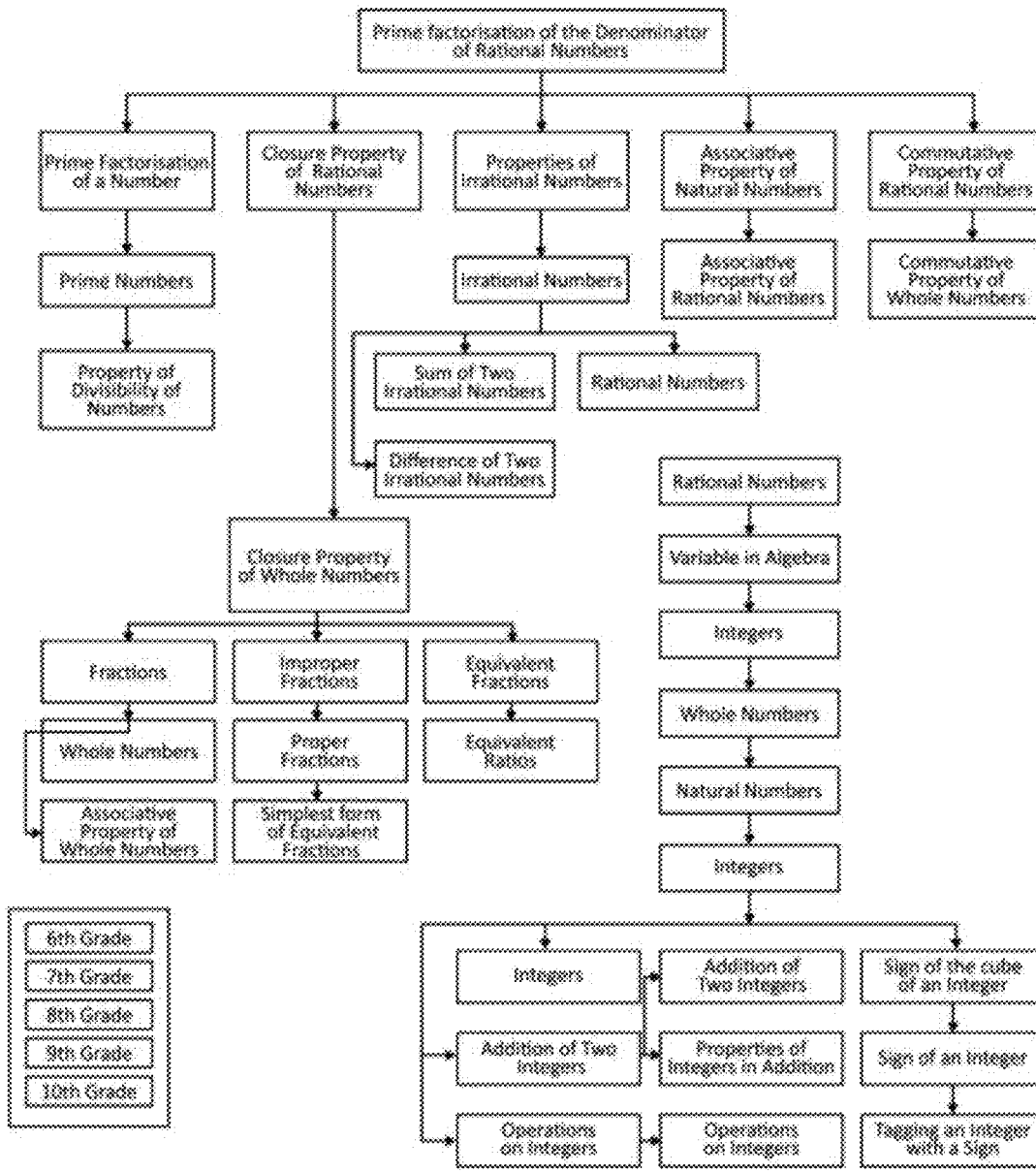
FIG. 3-A

302-A 

| decimals - 16 constructs |
|---|
| add_money | add_unit_values | addition_of_decimal | addition_of_decimal_and_fraction | convert_between_paisa_rupee | Convert_units | decimal_to_fraction | decimal_to_text | find_bigger_decimal | find_small_decimal | fraction_to_decimal | locate_digit_at_decimal_place | multiplication_of_decimal | substration_of_decimal | substraction_of_decimal_and_fraction | text_to_decimal |
| fraction - 19 constructs |
| integers - 11 constructs |
| knowingOurNumbers - 24 constructs |
| playingWithNumbers - 31 constructs |
| rationAndProportion - 6 constructs |
| wholeNumbers - 16 constructs |
| algebraicExpressions - 6 constructs |
| comparingQuantities - 4 constructs |
| dataHandling - 2 constructs |
| exponentsAndPowers - 12 constructs |

302-B 

| commonDecorators - 54 constructs |
|---|
| add_roman_numbers | apply_function_in_each_value | average | checkValues | combineConstructor | convert_currency | convert_to_latex | distinct | division_numbers | element_at | extend_list | find_median | form_largest_even_number_from_digits | form_largest_odd_number_from_digits | form_smallest_even_number_from_digits | form_smallest_odd_number_from_digits | generate_from_regex | generate_random_decimal | generate_random_decimal_from_range | generate_random_integer | greatest_number | index_of | intersection_lists | join_str_in_lists | length | limit | List_equality | make_list | make_str_inlist_withcase | match_str_nocase | match_in_list | min_in_list | multiplication | range_n_digit_number | range_numbers | reverse_list | roman_ascendingOrder | roman_descendingOrder | roman_predecessor | roman_successor | RoundDecimal | Shuffle_list | smallest_number | sort | str_concate | str_length | str_replace | str_reverse | str_to_charlist | str_to_list | summation | truncateDecimal | union_lists |

FIG. 3-B

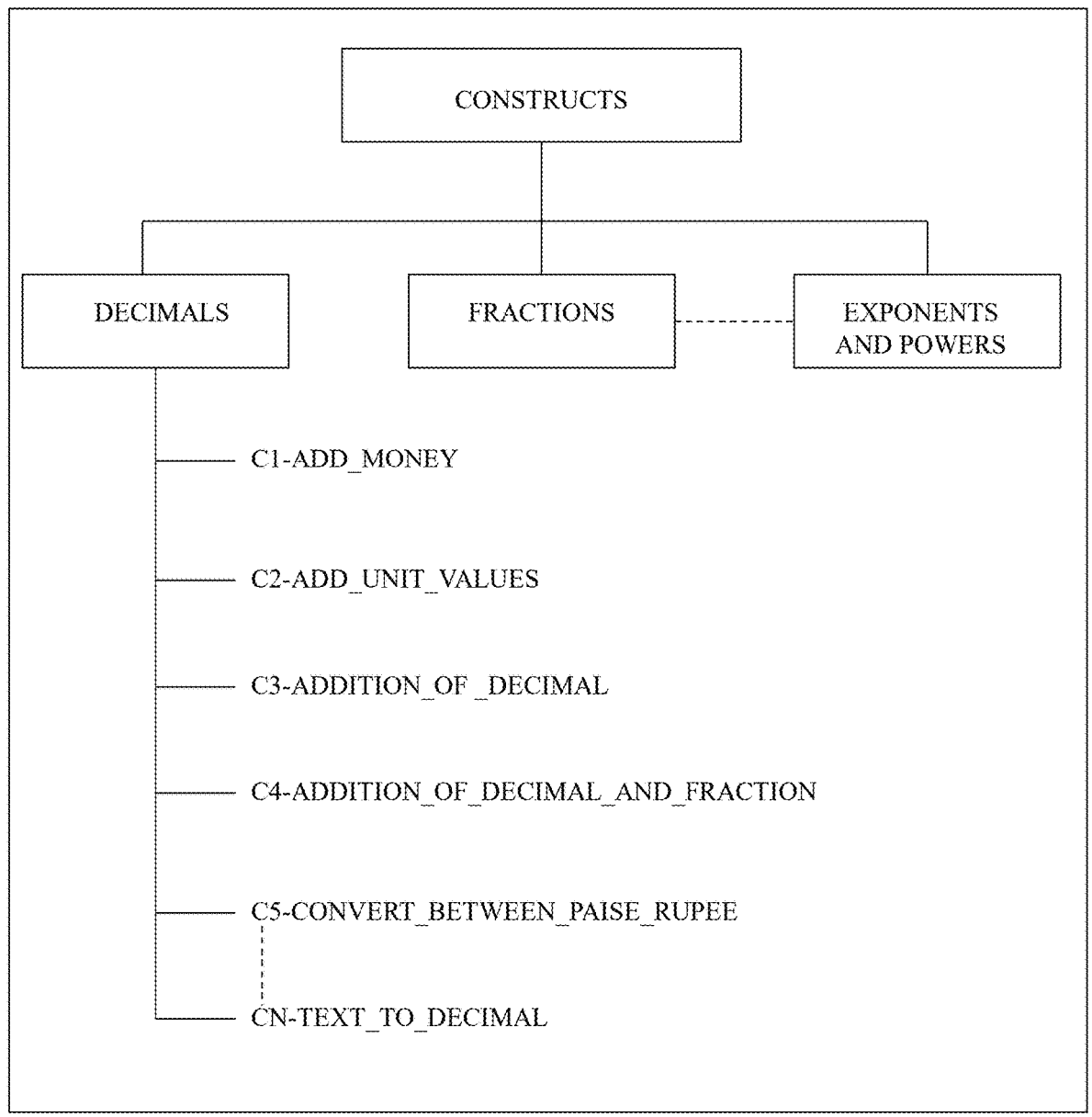
FIG. 3-C

FIG. 4-A

FIG. 4-B

FIG. 4-C

FIG. 4-D

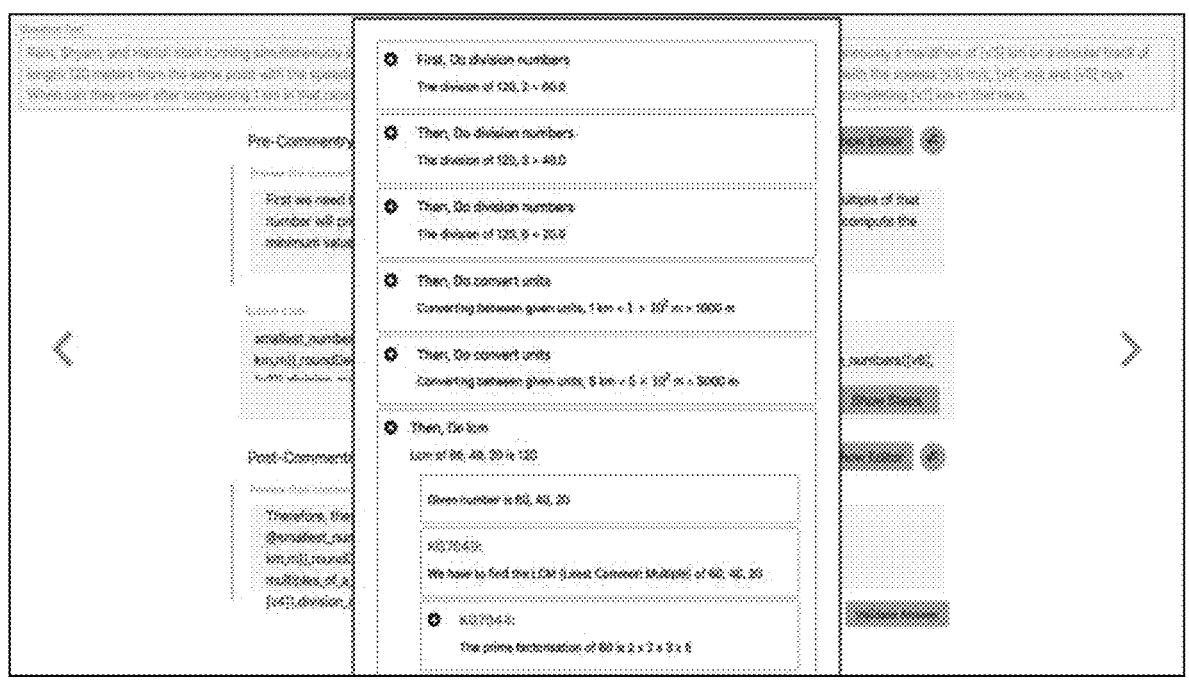
FIG. 5-A

500-B
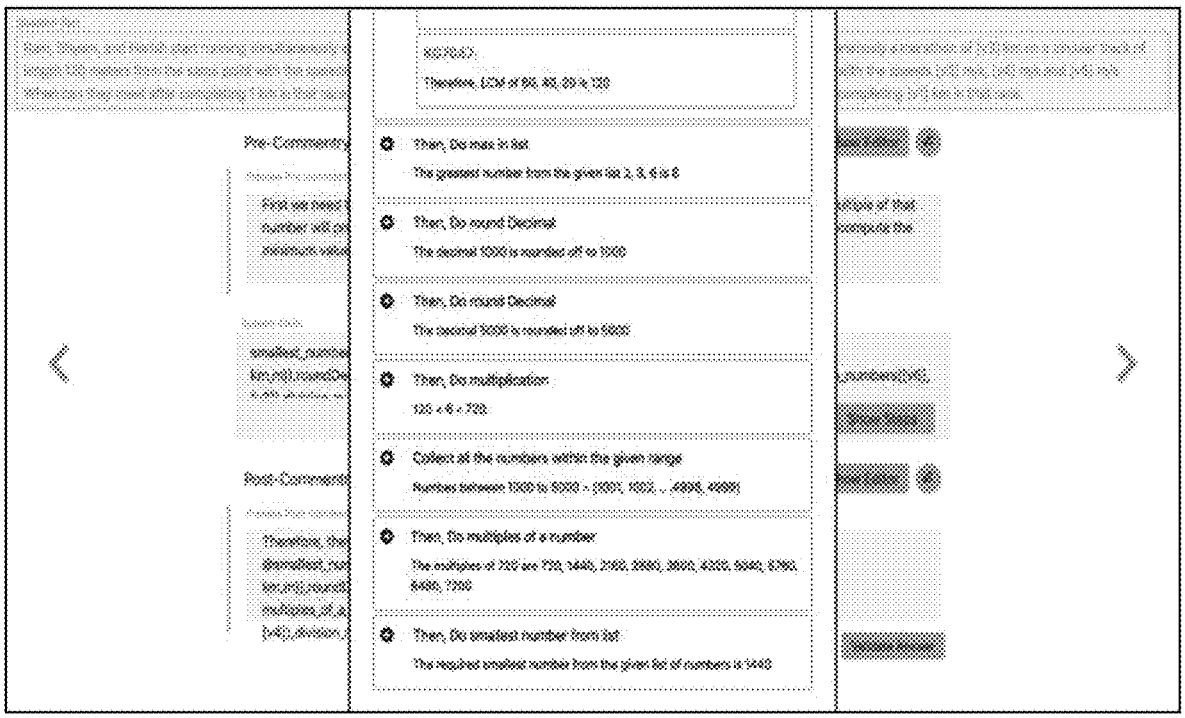
FIG. 5-B

600-A

Initialize Entities Labels

{e2} Values: Sita,Gita,Paresh,Dinesh,Suresh

{e3} Values: Harish,Ram,Dinesh,Suresh,Jake

{e4} Values: Jake,Bob,Ram,Shyam,Gita,Sita

{e5} Values: path,area,figure

{e6} Values: race,cycle race,swimming race

Initialize Attributes Labels

{a4} Values: Provide comma separated attributes (eg. remaining, total, cost etc.)

Initialize Attribute Values

{v1} Select Type: Choose From List | Values: 10,20,30,40

{v2} Select Type: Choose From List | Values: 10,20,30,40

{v3} Select Type: Choose From List | Values: 10,20,30,40

{v4} Select Type: Choose From List | Values: 120,240,360,480

FIG. 6-A

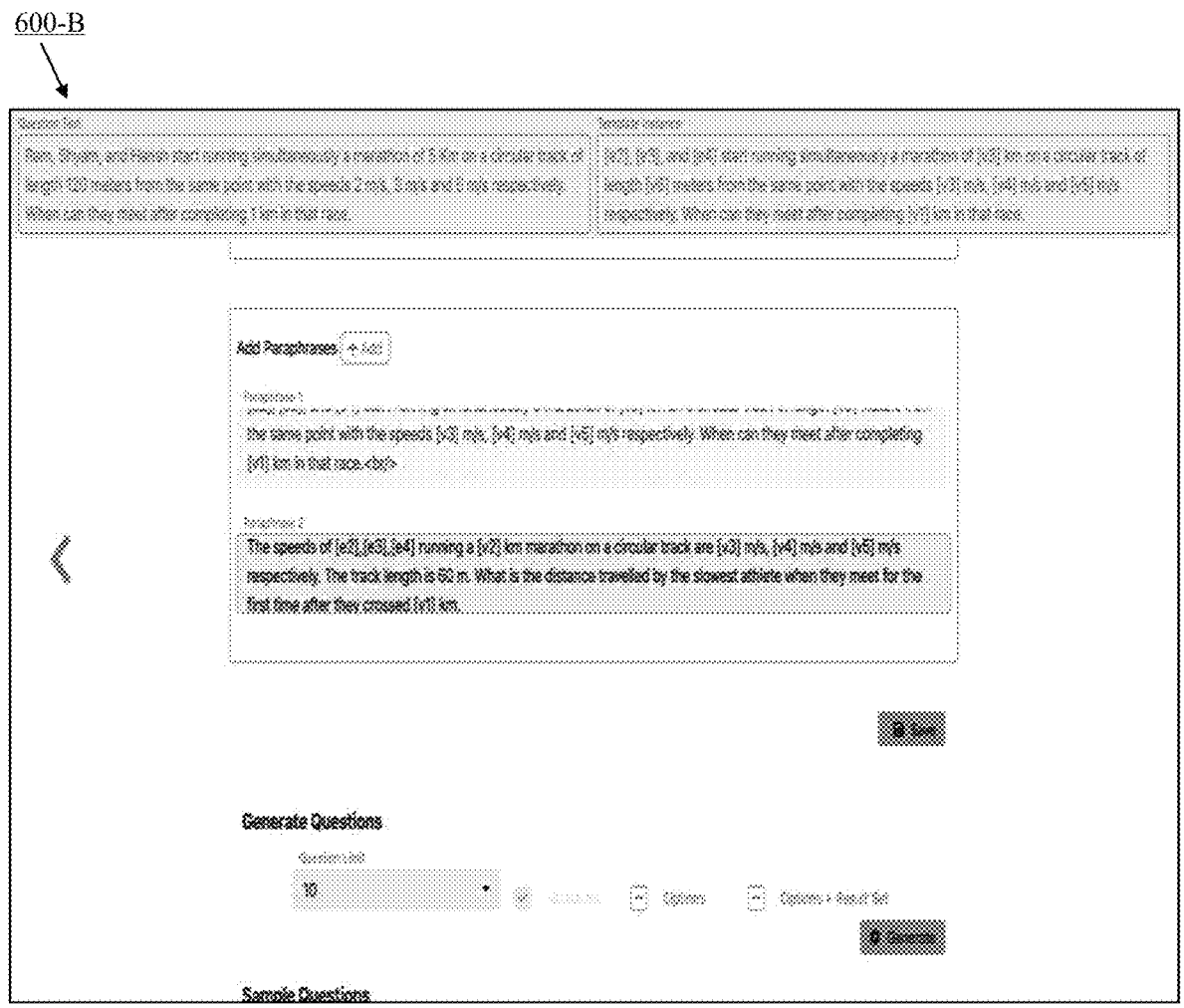
FIG. 6-B

FIG. 7

SYSTEM FOR GENERATING MULTIPLE SIMILAR QUESTIONS AND THEIR SOLUTIONS AND METHOD THEREOF

PRIORITY STATEMENT

The present application hereby claims priority from Indian patent application number 202041023357 filed on 3 Jul. 2020, the entire contents of which are incorporated herein by reference.

FIELD

The present disclosure generally relates to question generation and answer generation and more particularly to a method and system for creating a template for generating multiple similar questions and their solutions.

BACKGROUND

Generally, examinations are conducted in batches and at different times, owing to the large number of students participating in the examination. For conducting the examinations in batches, the examination conducting body needs multiple assessment papers with a set of similar questions, rather than identical ones, in order to avoid test paper leakage and unfair advantages that may be taken across the batches, by the students. The manner in which an assessment paper of a given quality level is generated is described in detail in Indian patent application numbered 201941012257 and U.S. patent application Ser. No. 16/684,434 titled "System and method for generating an assessment paper and measuring the quality thereof" having priority date of: Mar. 28, 2019, and publication (Non Patent Literature) Dhavala, Soma, et al. "Auto Generation of Diagnostic Assessments and Their Quality Evaluation." International Educational Data Mining Society (2020), the complete content of which is incorporated herein by reference. The word 'similar' used herein refers to questions similar to one another from the viewpoint of content and assessment but are not identical. For the sake of brevity, the term "similar questions" will be used in this disclosure to mean "questions similar to one another from the viewpoint of content and assessment".

Currently, there are several use cases which need a large number of similar questions. For instance, most examinations which are conducted over a period of time on batches of examinees rely on using similar questions for assessing the student's mastery of academic material. Therefore, while the goal and focus of examinations are the same, that is, assessing the ability of students, the individual test papers need to have questions that are similar across the test papers.

Additionally, it is known from learning theory that students learn by guided repetition. For this purpose, too, a large number of similar questions, are needed to help address students' learning gaps. Detailed analysis of learning theory including learning ability of the student, student's performance and improvement on such standardized test-based evaluations can be found in detail in U.S. Pat. No. 10,854,099 titled: Adaptive learning machine for score improvement and parts thereof granted on Dec. 1, 2020 and publication (Non Patent Literature) Donda, Chintan, et al. "A framework for predicting, interpreting, and improving Learning Outcomes." arXiv preprint arXiv: 2010.02629 (2020). In addition, the description and explanation of the learning ability of the student, based on behavioral attributes, question sequencing and other attributes is described in detail in U.S. patent application Ser. No. 16/586,525 titled "System and method for behavioral analysis and recommendations" and filed on Sep. 27, 2019, the complete content of which is incorporated herein by reference.

In education systems around the world, content is a major consideration. Content takes multiple forms such as learning content and assessment content. Learning content may be textual academic material, mathematical notations, videos, and the like. Assessment content may include test papers or assessment papers, for example. Assessment is typically carried out using questions that test some aspect of a student's knowledge. Questions constitute a major portion of academic content. Access to a large number of questions (for example question banks) across various domains and assessing various skills is key to being successful in the education sector. Questions by themselves are not sufficient. Students also need to be provided with solutions and methods for arriving at the solutions to the questions. To aid learning, not only solutions to questions, but also detailed explanations including a step-by-step solution, need to be provided. Along with the need for a large number of questions, another challenge is generating and providing a detailed explanation comprising step-by-step solutions for each question.

In practice, the conventional approach is to use manual effort (domain experts, expert faculty) to create and generate these questions. However, manual effort has many shortcomings. Manual effort is error-prone, is affected by individual bias, lacks consistency across creators. For example, a question is formed using characteristics such as entities, and attributes, and may include various linguistic styles. These characteristics may be prone to biased if the questions are created manually. In addition, the generation of similar questions with the aid of manual effort is also expensive and time consuming. Likewise, the generation of solutions for the question, using the conventional approach, also has shortcomings related to bias. A solution to a question may be approached in multiple ways, but, when the solution is created by an expert, the expert may prefer only one approach to other available approaches. In addition to shortcomings associated with bias, the expert-created questions and solutions are static in nature and cannot be altered or changed. It would be much more significant to have dynamic or runtime question generation, and step by step solutions which are relevant to the student based on his concept mastery. Every student has a different level of mastery on various concepts and based on concept mastery of the students, solution steps should be expanded. That is, someone who has mastered the concept of addition, the solution need not expand the sub-step of carrying out addition. Furthermore, students struggling to master any specific concept would require more content, which may not be possible if questions and their solutions are created manually, as in that case, the content associated with it would be limited.

SUMMARY

This summary is provided to introduce a selection of concepts in simple manners that are further described in the detailed description of the disclosure. This summary is not intended to identify key or essential inventive concepts of the subject matter nor is it intended to determine the scope of the disclosure.

To overcome at least one of the problems in the state of the art, that is, generating similar questions manually and generating step by step solutions to the questions, an automated way of generating similar questions, is needed. Thus, disclosed is a method and system for generating a number of similar questions. It must be noted here that unlike attempts to automate other processes that were hitherto carried out manually the present case poses many technical problems that need to be solved. Thus, this disclosure discloses all such solutions also.

Briefly, according to an exemplary embodiment, a system for generating at least one question that is similar to a given question is disclosed. The system includes a template creation module configured for creating a template representing the given question, wherein the template is created by implementing natural language processing techniques and performing steps of identification of one or more entities and recognition of relationships between them, identification of one or more attributes of each of the one or more entities, and identification of one or more values of each of the identified attributes. The system includes a similar question generation module for generating at least one question similar to the given question, using the template created and by replacing at least one value of at least one attribute in the template.

Briefly, according to an exemplary embodiment, a method for generating at least one question, that is similar to a given question is disclosed. The method is implemented by a computing device that includes a processor coupled to a memory. The method includes storing a plurality of modules in the memory and performing the steps of the method for generating at least one question similar to a given question. The method steps include creating a template representing the given question, wherein the template is created by implementing natural language processing techniques and performing steps of identification of one or more entities and recognition of relationships between them, identification of one or more attributes of each of the one or more entities, and identification of one or more values of each of the identified attributes. The method steps also include generating at least one question similar to the given question, using the template created by replacing at least one value of at least one attribute in the template.

The summary above is illustrative only and is not intended to be limiting in any way. In addition to the illustrative aspects, exemplary embodiments, and features described above, further aspects, exemplary embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein:

FIG. 3-A shows an example of a knowledge graph for a concept, showing interconnections between associated concepts;

FIG. 3-B shows an exemplary screenshot illustrating constructs and decorators defined in a solver library respectively, in accordance with an embodiment of the present disclosure;

FIG. 3-C is an example illustrating several constructs, wherein the constructs belong to a larger set of constructs, which are stored in the solver's library of the system of FIG. 2, in accordance with an embodiment of the present disclosure;

FIG. 4-A illustrate an exemplary screenshot for creating a template for generating similar questions, in accordance with an embodiment of the present disclosure;

FIG. 4-D is an exemplary illustration of a screenshot describing the steps to define the solver code, in accordance with an embodiment of the present disclosure;

FIG. 5-A is an exemplary screenshot illustrating solver code generated, by the eTSL compiler module to traverse the computational graph to compute and generate a step-by-step solution to a given question and each question generated; in accordance with an embodiment of the present disclosure;

FIG. 5-B illustrate exemplary screenshot of computation of factors of two numbers and providing detailed explanation comprising steps for arriving at a solution of computation respectively, based on the abstraction functionality, in accordance with an embodiment of the present disclosure;

FIG. 6-A is exemplary screenshot showing generation of a similar question using entry, attribute, and value replacer, respectively in accordance with an embodiment of the present disclosure;

FIG. 6-B is an exemplary screenshot showing generation of a similar question using question paraphrasing, respectively in accordance with an embodiment of the present disclosure.

FIG. 7 is an exemplary screenshot showing the similar questions generated for the given question, using the template instance, respectively in accordance with an embodiment of the present disclosure;

Figure 1:
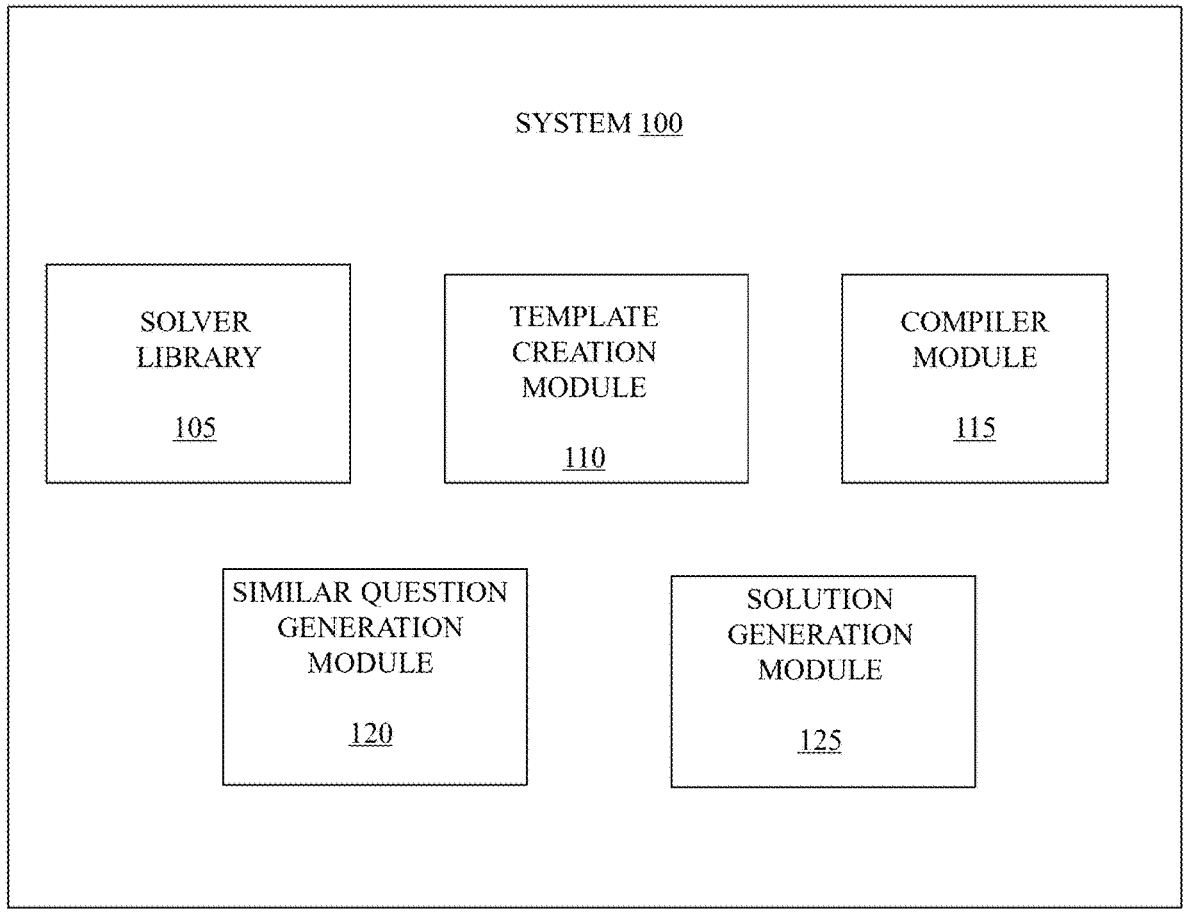
FIG. 1 is a block diagram of a system configured for creating a template for generating a number of similar questions and generating their solutions, in accordance with an embodiment of the present disclosure.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not comprise only those steps but may comprise other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In addition to the illustrative aspects, exemplary embodiments, and features described above, further aspects, exemplary embodiments of the present disclosure will become apparent by reference to the drawings and the following detailed description.

Embodiments of the present disclosure particularly disclose a system for creating a template for generating a number of similar questions and their solutions. A method of solving and providing correct solution along with multiple alternative incorrect solution options to each question generated is also disclosed. Such alternative incorrect solution options are referred to as distractors as their intended purpose is to distract the examinees from the correct answers. The method includes a module to determine the steps or sub-steps of the solution to be provided and displayed to the user, in a personalized manner based on their competencies and concept mastery, for arriving at a solution for each question generated. It may be noted here that the word "their" is used in this disclosure as a gender-neutral pronoun to mean "his or her".

The disclosed system is configured for creating templates representing a given question and generating multiple questions similar to the given question using the template. The system is configured for generating a solution to each similar question generated, using algorithmic solvers. The solution referred to herein, includes step-by step solution and explanation. The system disclosed herein includes a solver library, a template creation module, an 'education template specification language' compiler (hereinafter referred to as eTSL) module which is configured for running on a hardware processor, a question instance generation module referred to as a similar question generation module, and a solution generation module.

Embodiments of the present disclosure particularly disclose a method for creating a template for a given question and generating multiple questions similar to the given question using the template. The disclosure discloses a method for generating a solution to each similar question generated, using algorithmic solvers. The disclosure discloses a method for creating a solver library, creating a template, an eTSL compiler which is configured for running on a hardware processor, generating question instances, and generating a solution.

In some embodiments, the word 'test paper', 'assessment paper', 'question paper' and 'paper' used in the description may have the same meaning and may be used interchangeably. In some embodiments, the word 'user', 'candidate', and 'student' used in the description may have the same meaning and may be used interchangeably. In some embodiments, the word 'solution', 'answer', 'explanation' used in the description may have the same meaning and may be used interchangeably. In some embodiments, the word 'eTSL compiler', 'eTSL', 'compiler' and 'compiler module' that refers to an education template specification language compiler, used in the description may refer to the same entity or module and may be used interchangeably.

Embodiments of the present invention will be described below in detail with reference to the accompanying figures.

To further clarify advantages and features of the present invention, a more particular description of the invention will be rendered by reference to specific embodiments thereof, which is illustrated in the appended figures. It is to be appreciated that these figures depict only typical embodiments of the invention and are therefore not to be considered limiting of its scope. The invention will be described and explained with additional specificity and detail with the accompanying figures.

FIG. 1 shows a block diagram of a system 100 configured for creating a template of a question, based on a given question, for generating a number of similar questions and generating their solutions, in accordance with an embodiment of the present disclosure. The system 100 includes a solver library 105, a template creation module 110, a compiler module 115, a similar question generation module 120, and a solution generation module 125. Each block in FIG. 1 is described in detail below.

The solver library 105 includes data associated with the collections of computer executable instructions or program for solvers. The solver library 105 acts as a general resource of database for template creation, similar question generation, and the step-by-step solution generation. The solver library 105 comprises data associated with the collections of computer executable instructions or program for one or more solvers wherein the solvers are defined for a plurality of concepts of a knowledge graph.

In one example, the creation of solver library 105 includes the use of the knowledge graph and the data associated with concept mastery. The knowledge graph is prepared for an academic syllabus. The data associated with concept mastery of students may include mastery of the students on the concepts in the knowledge graphs to understand what concepts or paths in the knowledge graph is mastered or not. This data may be used for creating the solver library 105. In one example, the solver library 105 is developed by software developers, which implements solvers, which are functions to transform input into output. The solvers in the solver library 105 are mapped with concepts of knowledge graph.

The solvers may be of two types: a construct and a decorator. A construct implements a mathematical equation or a function and takes input variables and converts them into an output. A decorator facilitates interactions with and among solvers. Decorators provide flexibility for additional functionalities such as sort, limit, range, conversion, extend list, etc., and are used in conjunction with existing constructs. The solvers defined and stored in the solver library 105 are required for computing and generating the step-by-step solution for a given question and the at least one similar question.

The system 100 includes the template creation module 110. The template creation module 110 is configured for creating a plurality of templates. Each template created, of the plurality of templates, encodes the required pieces of information and placeholder elements that are used to instantiate and generate multiple similar questions. The template creation module 110 implements steps for entity identification and relationship recognition, attribute identification and value identification, setting constraints on the attributes, creation of solver code, and metadata assignment steps, which are explained in detail below in FIG. 2.

In one embodiment, the template creation module 110 is configured for creating the template representing the given question. In one example, a template may be created. The template creation module 110 is configured for creating the template by implementing natural language processing techniques and performing steps of identification of one or more entities and recognition of relationships between them, identification of one or more attributes of each of the one or more entities, and identification of one or more values of each of the identified attributes. The template creation module 110 is configured for creating the template representing the given question by setting up constraints on the values of the identified attributes using domain knowledge rules.

For example, for creating the template, representing the given question, natural language processing techniques are applied to input questions and entities, attributes, and values are extracted from it. The template is created, representing the given question (where the given question is the input question) by setting constraints on one or more of entities, attributes, and values.

In another embodiment, the template creation module 110 is configured for creating one or more solver codes, using solvers defined and stored in the solver library 105. These solver codes are required for computing and generating the step-by-step solution for the given question and the at least one similar question. In one embodiment, the one or more solver codes are created by implementing one or more AI models. In another embodiment, the one or more solver codes are created manually by a programmer.

In yet another embodiment, the template creation module 110 is configured for assigning metadata to the given question and the template created, by using a combination of syntactic and semantic features and AI models. The assignment of the metadata to the template created enables transferring the assigned metadata to each similar question generated and the step-by-step solution generated. The metadata assigned to each similar question and the step-by-step solution may be used contextually for delivering efficient learning to the student.

The system 100 includes an eTSL compiler module 115. The compiler module 115 is configured for running on a processor of a computing device. The functionality of the compiler module 115 includes computational graph traversal, abstraction, personalization, and validation.

The eTSL compiler module 115 is configured for creating a computational graph from the one or more solver codes. In other words, one or more solver codes associated with the template created are compiled to create the computational graph. The eTSL compiler module 115 is configured for executing the computational graph, for generating the step-by-step solution to the given question and the at least one similar question.

In one example, the solver codes created, comprise one or more solvers arranged in their sequence of execution, required for computing and generating the step-by-step solution for the given question and the at least one similar question. The eTSL compiler module 115 compiles the solver code to traverse a computational graph to compute the solutions to each question generated. The solver code compiled from the computational graph is an ordered list of steps to be executed, where each step can further be an ordered list of sub steps, and so on.

Further, the system 100 includes the similar question generation module 120. Using the template created, the similar question generation module 120 is configured for generating, at least one similar question to the given question.

The similar question generation module 120 is configured for generating the at least one similar question using natural language generation techniques by replacing one or more of the one or more entities identified and the one or more attributes identified, or both, with a semantically equivalent entity through the use of domain knowledge rules.

The similar question generation module 120 is configured for generating the at least one similar question by replacing one or more attributes and values of attributes, based on the constraints set, using the domain knowledge rules.

The similar question generation module 120 is configured for generating the at least one similar question using natural language generation techniques after paraphrasing the template; wherein paraphrasing comprises reconstituting parts of the template into other linguistic forms with the same semantic meaning by changing one or more of syntax and grammatical structure of the given question.

Thus, the similar question is a question generated by replacing one or more of the entities, attributes, and values by adhering to the constraints defined in the template. In one example, paraphrasing can also be done to make it linguistically different from the original given question.

Further, the system 100 includes the solution generation module 125. The solution generation module 125 is configured for writing and providing the step-by-step solution generated in a human-readable manner Here, writing means arranging the text in a human readable form on a computer screen, for example.

The solution generation module 125 includes a distractor generation module configured for generating a distractor, for the given question. The distractors are generated based on predefined distractor generation rules set by a one or more experts. The distractor generator module generates possible alternative answer choices that are close enough or possible mistaken answers to the correct answer(s) within established constraints.

In one example, distractors are generated when similar questions are being generated for a given question that is a single choice question, a multiple-choice question, or a fill-in-the-blank question.

In another example, similar questions are generated for a given subjective question. So, the similar question is also a subjective question. Such subjective questions do not have one or more answers to select from. However, the similar questions generated may be converted to objective questions either single choice or multiple choice. In such cases also distractors are generated.

The manner in which the modules and their sub-modules of the system 100 of FIG. 1 operate for creating a template for generating a number of similar questions and their solutions, is described in further detail below.

Figure 2:
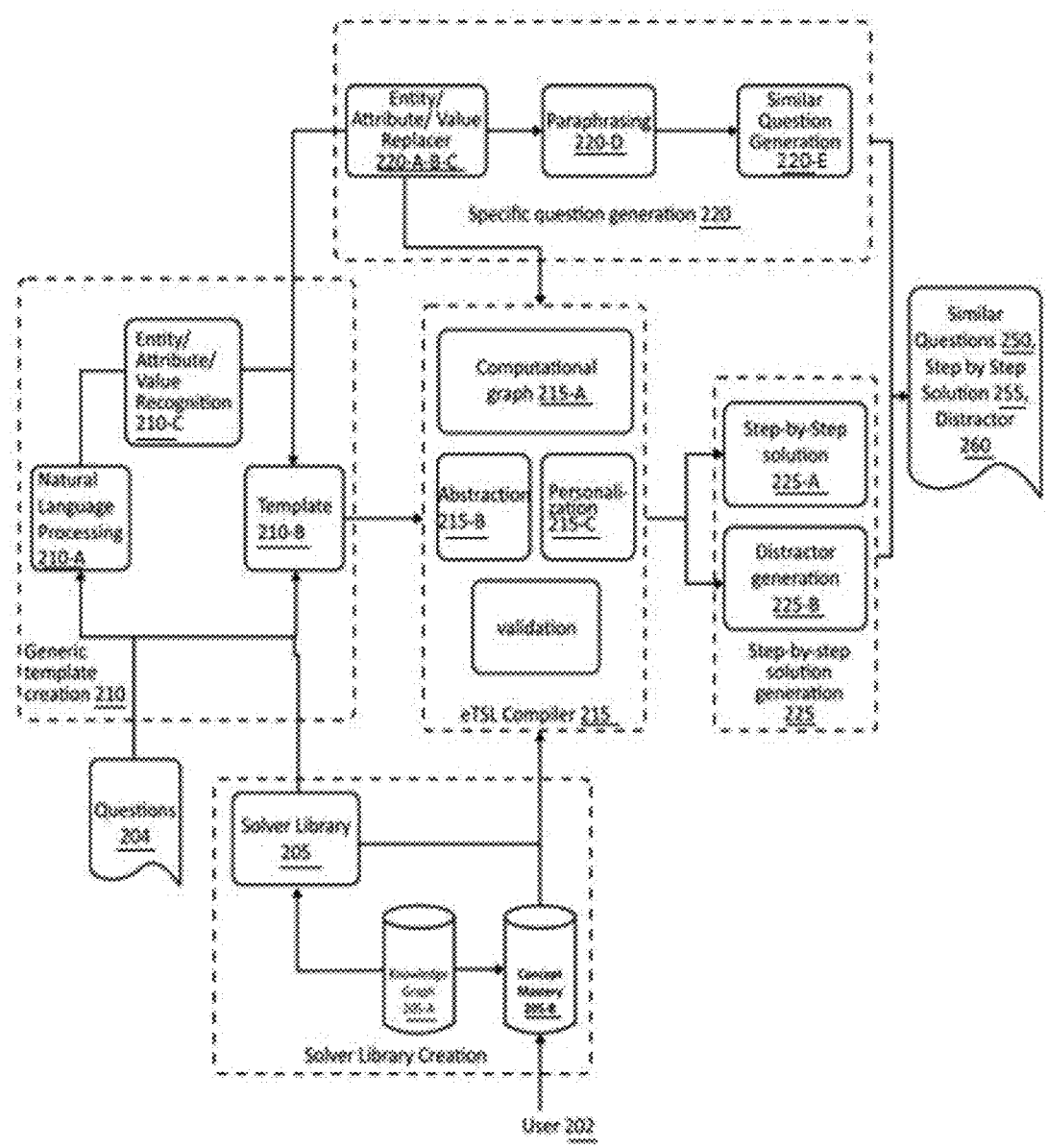
FIG. 2 is a detailed view of the system of FIG. 1 configured for creating the template for generating a number of similar questions and generating their solutions in accordance with an embodiment of the present disclosure.

FIG. 2 shows a detailed view of the system 100 of FIG. 1, in accordance with an embodiment of the present disclosure. FIG. 2 illustrates a block diagram of a system 200 configured for creating a template of a question, based on a given question, for generating a number of similar questions and generating their solutions, in accordance with an embodiment of the present disclosure. In particular, FIG. 2 is a detailed block diagram illustrating several modules and sub-modules for creating the template 210-B of the given question 204 and for generating the step-by-step solution 255, for each of a plurality of questions (250) generated which are similar to the given question 204. FIG. 2 also illustrates modules for generation of distractor 260. The distractor generator module 225-B is configured for generating distractors 260 based on predefined distractor generation rules set by a one or more experts. The distractors 260 are the possible alternate answer choices that are close enough or possible mistaken answers to the correct answer(s) within established constraints.

The main steps for generating the step-by-step solution 255 for the number of similar questions 250 includes: (1) creation of the template for the given question 204, using a template creation module 210, (2) template compilation using the eTSL compiler module 215, and (3) step-by-step solution generation 255 using the solution generation module 225.

In one embodiment, the template creation module 210 is configured for creating the template for the given question 204, and such template created is used for generating one or more similar questions 250. The template creation module 210 is configured for executing the steps of entity identification and relationship recognition, attribute identification and value identification, setting constraints on the attributes, creation of solver code, and metadata assignment steps. The metadata assignment for the given question 204 includes the steps of the assigning metadata such as difficulty level, competencies to knowledge graph nodes.

In one embodiment, the template compilation with eTSL compiler module 215 includes the steps of computational graph traversal, and is configured for implementing the abstraction functionality, personalization functionality, and validation functionality.

The eTSL compiler module 215 is configured for creating a computational graph from the one or more solver codes. The eTSL compiler module 215 is configured for executing the computational graph, for generating the step-by-step solution 255 to the given question 204 and the at least one similar question.

In one embodiment, the solution generation module 225 is configured for step-by-step solution generation in a readable form, and distractor generation, wherein the distractor generation is used generating distractors, based on predefined distractor generation rules set by a one or more experts.

Referring now to FIG. 2, the system 200 includes a solver library 205, the template creation module 210, the eTSL compiler module 215, a similar question generation module 220-E, and the solution generation module 225. In particular, FIG. 2 shows sub-modules present for solver library creation 205, the template creation module 210, the eTSL compiler module 215, the similar question generation module 220-E, and the solution generation module 225. Each module and their sub-modules are explained in detail further below.

The solver library 205 includes data associated with the collections of computer executable instructions or program for solvers. Solvers are created for concepts of knowledge graphs, wherein an example of knowledge graph concepts is shown in FIG. 3 as 305-A.

The creation of solver library 205 includes the use of the knowledge graph 205-A and the concept mastery 205-B. The paragraphs below explain, the creation of the solver library 205.

In one embodiment of the present disclosure, an efficient way to create a solver library 205 is to use knowledge graphs 205-A and a set of interconnected concepts 205-B. The knowledge graph 205-A facilitates defining what are interconnected concepts 205-B, and how they are mathematically related, if they are. Knowledge graph 205-A, also referred to as knowledge base is an arranged topology of a plurality of the interlinked nodes, wherein, each node represents a concept.

The knowledge graph 205-A is described in detail in Indian patent application numbered 201941012401 and U.S. patent application Ser. No. 16/586,512 titled "System and method for recommending personalized content using contextualized knowledge base", having priority date of: Mar. 29, 2019, the complete content of which is incorporated herein by reference. The manner in which the knowledge graph 205-A is leveraged in academic context for academic content is described in detail in Indian patent application: 201941012256 and U.S. patent application Ser. No. 16/740,223 titled "System and method for personalized retrieval of academic content in a hierarchical manner", having priority date of: Mar. 28, 2019, the complete content of which is incorporated herein by reference.

Embodiments of the present disclosure, disclose an efficient way for creating the solver library 205. In one embodiment, the process to create the solver library 205 is to use knowledge graphs 205-A and a set of interconnected concepts 205-B. The knowledge graph 205-A facilies defining interconnected concepts, and how they are mathematically related, if they are.

An example of knowledge graph 305-A, with interconnections between concepts is illustrated in FIG. 3-A. The FIG. 3-A illustrates an example 305-A of concept "prime factorisation of denominators of rational numbers and its related concepts and interconnected concepts.

A solver is a computer program or a function which solves a mathematical equation to derive an output from a set of inputs with a given set of constraints or input parameters. Each concept as represented in the knowledge graph 205-A may have one or more solvers associated with it. Implementation of multiple solvers is possible for a concept since there could be multiple approaches or methods to derive an output (for example, target concept) given a set of inputs. These approaches can vary based on difficulty level of the concept, time to compute, levels of information available, or other factors.

The solvers may be of two types: a construct and a decorator. A construct as shown by reference numeral 302-A in FIG. 3-B implements a mathematical equation or a function and takes input variables and converts them into an output.

A decorator as shown by reference numeral 302-B in FIG. 3-B facilitates interactions with and among solvers. Decorators provide flexibility for additional functionalities such as sort, limit, range conversion, extend list, etc., and are used in conjunction with constructs.

As described above, a solver is a computer program or a function which solves a mathematical equation to derive an output from a set of inputs with a given set of constraints or input parameters, if any. For example, consider any mathematical equation:

velocity=distance÷time

This may be thought of as a solver, which takes input parameters of distance and time, and computes the output value of velocity by implementing the equation as a computer program.

As mentioned above, there are two types of solvers: a construct and a decorator. A construct implements a specific mathematical equation or function, which takes input variables and converts them into output. For instance, compute_area_of_circle is a solver which takes radius_of_circle as an input and computes the area of the circle as output. It is to be noted that, the constructs belong to a larger set of constructs, and not limited to as shown in an exemplary screenshot 302-A shown in FIG. 3-B and in screenshot 302-C of FIG. 3-C.

The decorators (as shown in exemplary screenshot 302-B of FIG. 3-B) facilitates interactions with and among solvers. It provides flexibility for additional functionalities such as sort, limit, range, conversion, extend list, etc., which can be used in conjunction with existing constructs. For example, 'providing the first 5 multiples of a number' can be returned with the help of 'limit' decorator on top of 'multiple_of_a_number' construct.

The data associated with the concept mastery 205-B of the student (or the user 202) which shall be used for creating the solver library 205, can be defined as information associated with mastery or thoroughness with which a student knows a particular concept. For example, each student has a concept mastery and competency-level based on his learning progress for that concept.

Thus, the solver library 205 is created by using the data from the knowledge graph 205-A and the information associated with the concept mastery 205-B of the student. The data stored in the solver library 205 may be used for creating the template for the given question 204 and template compilation with eTSL compiler module 215. In addition to information associated with the concept mastery 205-B of the student, the solver library 205 uses various configuration parameters such as abstraction and personalization when the solvers are executed by eTSL compiler module 215. The solver library 205 is configured to show interfaces to invoke a solver or set of solvers in a particular sequence.

Referring now again to FIG. 2, the template creation module 210 is configured for creating the template for the given question 204, wherein the template is created by implementing natural language processing techniques (210-A) and performing steps of (210-C): entity identification and relationship recognition, attribute identification and value identification, setting constraints on the attributes, implementing solver code, and assignment of metadata for the given question 204. The following paragraphs explain, the creation of the template.

The template creation module 210 includes a created template 210-B, a natural language processing unit 210-A, and an entity identification, attribute recognition, and value identification unit 210-C. The templates 210-B can be thought of as a question generator. Each template encodes the required pieces of information and placeholder elements that are used to instantiate multiple questions. For the purpose of explanation, let us consider an example sentence: Sentence A: "A car is moving towards a wall with a velocity of 10 m/s". The following steps are involved for template creation:

The functionality of template creation module 210 for entity identification and relationship recognition 210-C are explained herein. Using natural language processing (NLP) techniques 210-A like entity identification and co-reference resolution as known in the art, entities and relationships are identified and extracted from historical datasets of questions. Each entity is categorized into an entity type. Considering the above example, in sentence A, "car" and "wall" are two entities. The entity type of "car" is "moving object".

The functionality of template creation module 210 for attribute identification and values identification 210-C is explained herein. Attributes are the properties of entities. For example, in sentence A, "velocity" is an attribute of the "car" entity. Further, the attribute "velocity" is instantiated with a value of "10 m/s". Natural language understanding (NLU) techniques 210-A as known in art are implemented to extract this information from the data or text.

The functionality of template creation module 210 for setting constraints on attributes (210-C) is explained herein. Attributes of entities can take different possible values. However, there are constraints that impose restrictions on the set of possible values that an attribute can take. The constraints are set using domain knowledge rules. The constraints can be of various types such as absolute constraints and relative constraints, for example. The absolute constraints can be list-based, range-based, etc. The relative constraints are dependent on each other. For instance, in one example, in the computation of velocity, 'v', if distance, 'd' and time, 't' are both positive, then 'v' must also be positive. In another example, Ram is taller than Shyam. Ram's height is 5 feet, whereas Shyam's height is 5 feet 9 inches. Note that Shyam.height<=Ram's height.

The above-described template creation module 210 for creating the template for generating similar questions 250 of the given question 204 and the step-by-step solution 255, may employ several user interfaces for entity identification and relationship recognition, attribute identification and value identification, setting constraints on the attributes, creation of solver code, and metadata assignment steps and such creation of the template shall be explained with examples. Some example interfaces are described in further detail below. It is noted that the present technique is by no means intended to be limited to these example embodiments.

Figure 4:
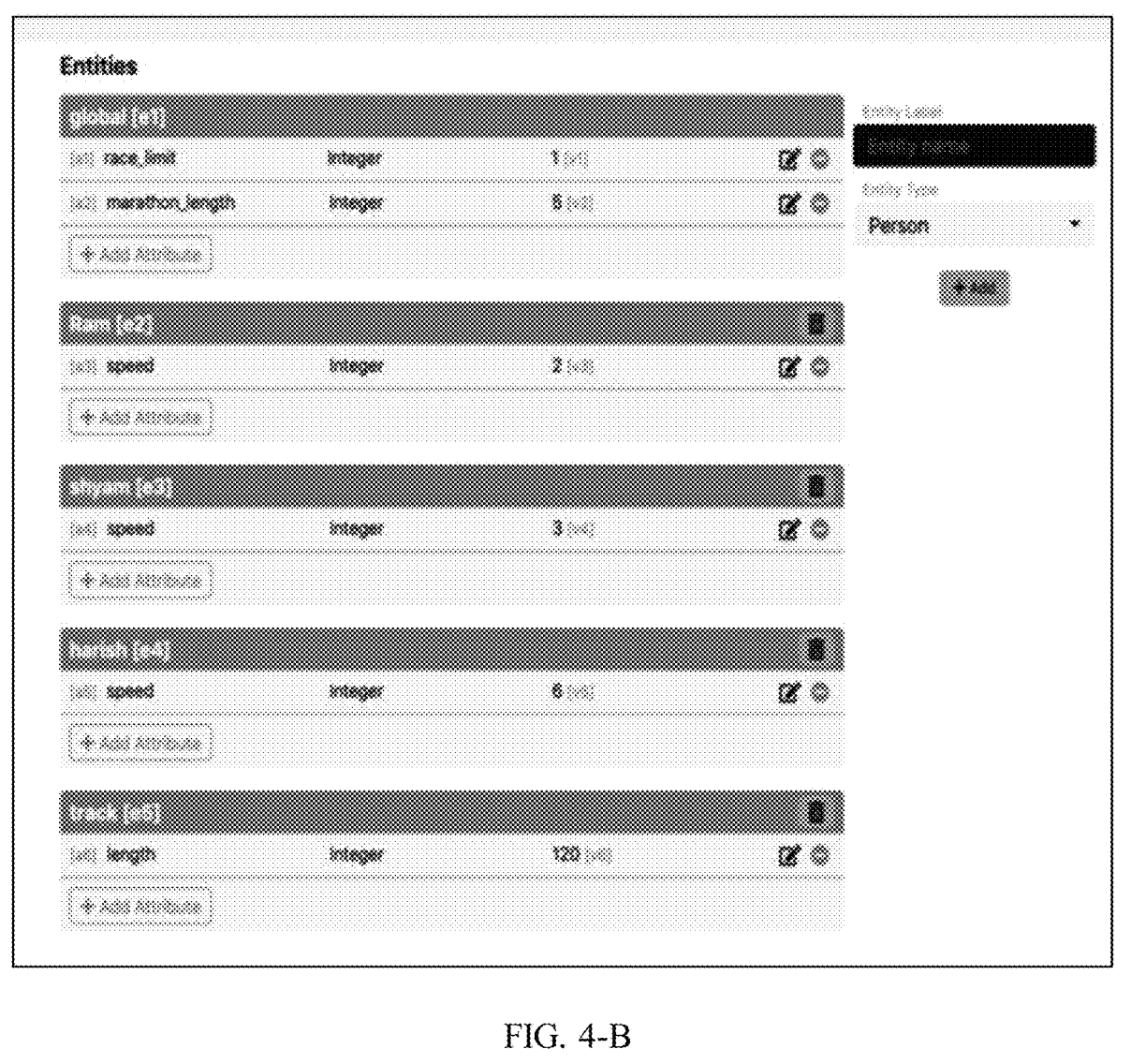
Figure 4:
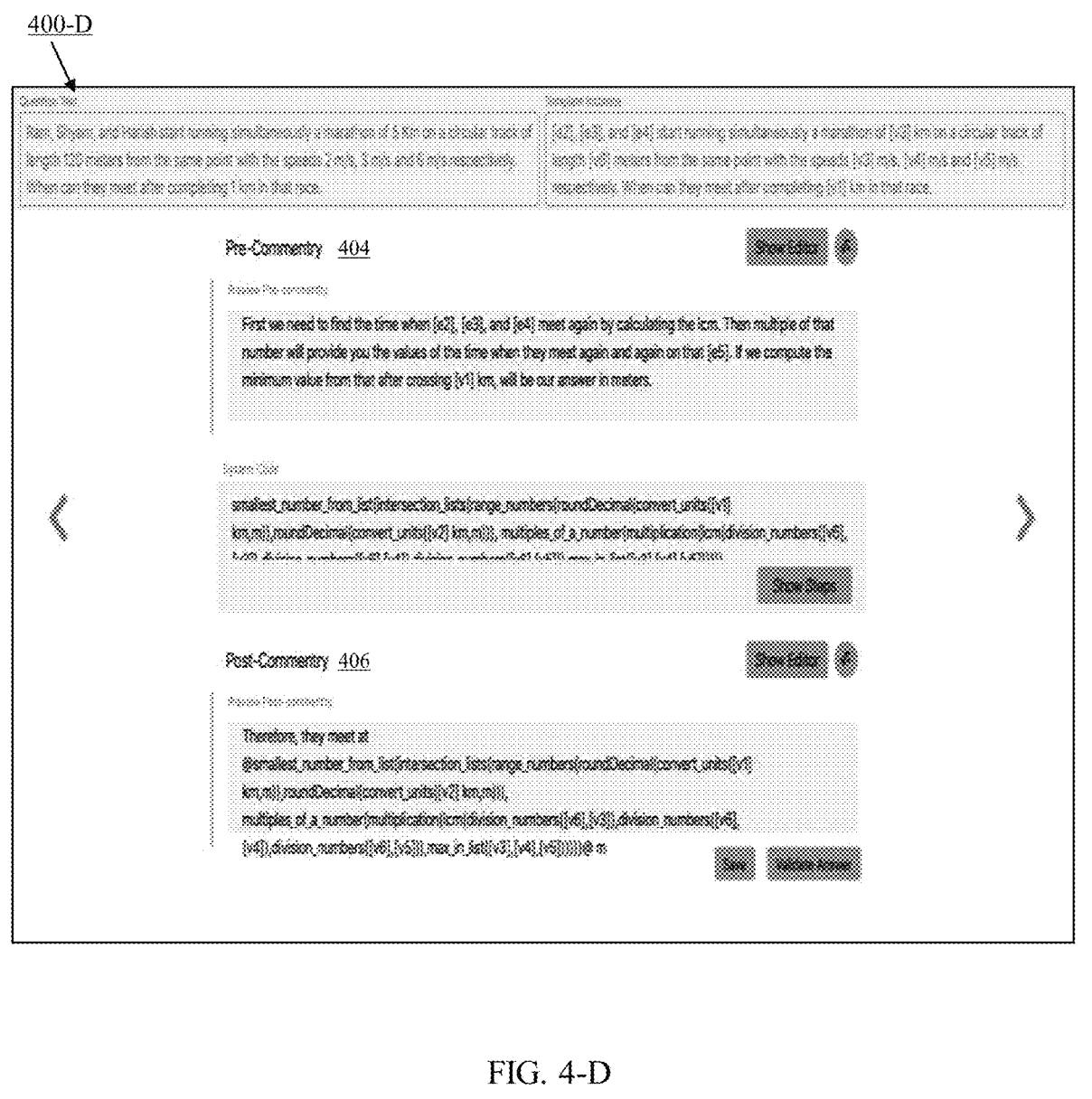

FIG. 4-A illustrate an exemplary screenshot 400-A for creating a template for generating similar questions, in accordance with an embodiment of the present disclosure. Considering an example of the template as shown in FIG. 4-A, in one embodiment, a user interface is provided to the user to enter and save a question in the question body 402. For example, the question (given question) entered is—Ram, Shyam, and Harish start at the same time from the same point, on a race of 5 km, on a circular track of length 120 meters with speeds of 2 m/s, 3 m/s, and 6 m/s respectively. When can they meet after completing 1 km in that race?

In this example, the entities are categorized as Ram, Shyam, and Harish. The attributes of Ram, Shyam, and Harish are their running speeds and the values are 2 m/sec, 3 m/sec and 6 m/sec, respectively. Herein, the question is reduced to entities, attributes, and possible values; the next step is to invoke solvers from the solver library to create the one or more solver codes, required for generating the step-by-step solution. The solver code is a set of instructions to execute a set of solvers in a particular order. There can be multiple ways of solving a given question. Hence, there can be multiple solver codes associated with the template, where in each solver code is a unique way to solve the question.

FIG. 4-D is an exemplary illustration 400-D describing the steps to create the solver code. Solver code consists of the set of instructions which are configured to execute in a given order to run and execute a solver. For example, there can be multiple ways of solving the given question 204. Hence, there can be multiple solver codes associated with a template (where each solver code includes a unique way to solve the question). For example, root of an equation can be found using multiple methods. One such method may include steps such as factorizing the middle element, or another method may include applying the direct formula to extract the roots.

In one embodiment, the solver codes can be created using different constructs (functions) presented in the solver library 205. Referring to the screenshot 400-D as shown in FIG. 4-D, the pre-commentary text block 404 denotes the text which could be displayed to the user 202 as human readable explanation before the user 202 could see the stepwise solution for a question. Furthermore, the post commentary text 406 could be displayed to the user 202 as the conclusion or understanding of the entire solution for the given question 204.

Further, as mentioned above, the template creation module 210 is also configured for assigning metadata to the given question 204 and the template created, by using a combination of syntactic and semantic features and AI models. The metadata assigned to the template created enables transferring the assigned metadata to each similar question generated 250 and the step-by-step solution generated 255. The metadata which is transferred to each similar question 250 and the step-by-step solution 255 may be used contextually for delivering efficient learning.

In some cases, each question may have different metadata associated with it. For example, some questions are harder to solve than others, some take more time to solve than others. Once entities, relationships, attributes, values, constraints, and solver code or codes are identified, recognized, set and created, using a combination of syntactic and semantic features and AI models or expert labelling, template (along with solver code) is tagged to the knowledge graph. The tagging is done to academic concepts, competencies of the knowledge graph based on the concept (that is, what specific aspects of knowledge will a user gain when learning the concept?) For example, learning the concept of multiplication will reinforce the idea of repeated addition. The tagging is done to academic concepts, competencies of the knowledge graph based on learning map, difficulty level, ideal time, bloom level, and the like.

The metadata assignment at the template creation phase 210 is explained in detail herein. For example, as described above, a template is created for the given question 204. The template has one or more solver codes created. The solver code is a sequence of solvers. Each solver defined in the solver library 205 is tagged to the knowledge graph 205-A. For example, addition is a solver tagged to the concept of 'adding numbers' of the knowledge graph 205. Thus, the solver which is tagged to the knowledge graph 205-A enables the tagging of the created template 210-B to the knowledge graph 205-A.

The length of solver code created, depends on the complexity of the question. Hence, the difficulty level or the complexity of the question, can be decided and tagged to knowledge graph 205-A at the template creation phase 210. Thus, for every template created, a metadata can be assigned to the template. Thus, the template is tagged to this concept of knowledge graph. Thus, the metadata at the question level is transferred to the template at the template creation level.

Another possibility is that the metadata may not be available at the question level. So, while creating the template, when the solvers are invoked to create the solver code, the metadata can be assigned to the template, during its creation.

As a result, this functionality of assigning metadata to the template during its creation, may enable, the inheritance of the same metadata to each similar question 250 and solution generated 255 from the template. The metadata inherited by the similar question 250 and solution generated 255 may be utilized by the question contextually for delivery learning outcome.

Referring now again to FIG. 2, the functionality of the eTSL compiler module 215 include computational graph traversal, abstraction, personalization, and validation of the questions generated from the template. Each functionality of the eTSL compiler module 215 is explained in detail below.

Computational Graph Traversal 215-A: The graph of entities and directed relationships are analyzed and algorithmic steps to traverse from given attributes and values associated with entities to unknown attributes and values are generated. This is a logical flow of steps needed to solve a particular question. These logical steps are invocation of solvers defined in the solver library 205, by passing expected values of attributes of entities, and outputs are assigned to further not defined entities attributes. The eTSL compiler module 215 compiles the solver code to traverse this computational graph to compute the step-by-step solution 255 to each question generated.

FIG. 5-A is an exemplary screenshot 500-A illustrating a solver code compiled by the eTSL compiler module 215 to traverse the computational graph to compute and generate the step-by-step solution 255 to each question generated, in accordance with an embodiment of the present disclosure. The solver code generated from the computational graph is an ordered list of steps to be executed, where each step can further be an ordered list of sub steps, and so on. The example of solver code generated from the computational graph in an ordered list of steps and an ordered list of sub steps is shown in FIG. 5-A.

Abstraction: The eTSL compiler module 215 also includes abstraction functionality 215-B.

FIG. 5-B illustrate exemplary screenshots 500-B of computation of LCM of numbers and providing a detailed explanation comprising steps for arriving at a solution of computation respectively, based on the abstraction functionality, in accordance with an embodiment of the present disclosure.

Each solver construct or decorator is not only executed to convert the set of input values to an output value, but an explanations is also generated for each step of the solution. For instance, a solver area_of_a_circle(r), would generate explanation as follow:

Radius of circle is r $$\text{Area of circle} = \text{Area of circle} = \pi \times \text{radius}^2 \text{Hence:}$$
$$\text{Area} = \pi \times r^2$$

However, for learning environments, it is desirable to be able to skip parts of the explanation of a solver, that is, for higher grade students there is no point to further split LCM into factorization, but for lower grade students it would be needed. Abstraction level sets the explanation of solvers at a desired level. All sub-steps of the solution are executed but only desired steps are included in the explanation. The abstraction level sets the explanation of solvers at a desired level. The abstraction functionality is set based on the student's concept mastery and competency-level profile.

Personalisation: The eTSL compiler module 215 also includes personalization functionality 215-C. Each student has a concept mastery and the competency-level based on his learning progress for that concept. Based on the student's concept mastery and the competency-level profile, all possible solvers for the target concept are ranked and the most suitable solver is chosen to compute a real-time solution along with its explanation. The abstraction level is also set based on the student's concept mastery and competency-level profile. Below are the examples illustrating the concept of personalization.

Example 1: Points on a two dimensional plane can be defined by either Cartesian coordinates or Polar coordinates. To find the Euclidean distance between any two points on a plane, there is a standard Euclidean distance formula which uses the Cartesian coordinate representations of the two points.

A user X may be aware of how to convert Polar coordinates to Cartesian coordinates and can therefore easily solve a question about distance when presented with points in Polar coordinate representation.

A user Y may only have knowledge about the Euclidean distance formula but is unable to apply Polar to Cartesian coordinates conversion when a question asks to find the distance between two points given their Polar coordinates. Hence, the extra steps are needed to guide the student (user Y) to first convert the Polar coordinates to Cartesian coordinates and then substitute those values into the distance formula.

Example 2: The area of a circle can be derived from its radius and knowing the formula $$Area = \pi \times radius \times radius.$$

However, radius is related to diameter as radius=diameter÷2. A student may only have knowledge of the area formula but is unable to apply it to compute the area when only the value of the circle's diameter is given. Hence, the extra steps are needed to guide the student to first find the circle's radius and then use that value in the formula for area of a circle. Or, if student has concept mastery in radius and diameter conversion, he could directly apply formula:

$$Area = \pi \frac{d^2}{4}.$$

Validation: The eTSL compiler module 215 also includes validation functionality 215-D. The validation functionality is to check if the template and solver code are correctly created by comparing computed solutions for a given entity, attributes, and values for a question with an expected solution. An expert submits the expected solution for a set of entities, attributes, and values for a question. Once the template and solver code are created for a question, it is executed to compute the solution by taking entities, attributes, and values given for a question as input. It is compared with the expected solution given by experts, and the template is declared valid if it matches. The check can be done multiple times by passing different sets of entities, attributes, and values, and expected solutions for a question to cover different cases of solving a question.

Solution generation module 225: As described above, the system 200 is configured for creating a plurality of templates and step-by-step solutions 255 for the each given template. Multiple question instances can be generated, using the template generated. It is to be noted that, each template includes one or more methods to generate step-by-step solutions 255. In other words, the template created, is configured to have multiple solver codes associated with it, and each solver code is corresponding to a different method of solving the given question 204.

Now, each question instance (that is generated from a template) varies in the actual entities, attributes, and values present. And each question instance will have its own one or more step-by-step solutions 255 after substituting actual entities, attributes, and values in the template.

Referring now again to FIG. 2, the system 200 includes the solution generation module 225. The solution generation module 225 includes a module 225-A for writing and providing the step-by-step solution 255 generated in a human-readable manner. The solution generation module 225 includes a distractor generation module 225-B. Each module is described in detail below.

Solution generation module 225-A: Entities, attributes, and values are initialized from the given input question. At this step, a solution from a given template is generated by executing the computational graph with the given values of attributes derived from the question in the template creation phase. Each step generated is based on the abstraction and personalization module in eTSL compiler module 215 which takes the user's concepts mastery as input. For example, if the concept of "addition" is so obvious to student, it does not make sense to expand the step of addition.

Further, these steps are also tagged with metadata such as knowledge graph concepts, for example, as derived from the solver library 205.

Distractor generation 225-B: The solution generation module 125 includes a distractor generation module 225-B configured for generating a distractor 260, for the given question 204. The given question 204 may be a single choice question, a multiple-choice question and a fill in the blank question or a subjective question. The distractors 260 are generated based on predefined distractor generation rules set by a one or more experts. The distractor generator module generates possible alternative answer choices that are close enough or possible mistaken answers to the correct answer(s) within established constraints.

In one example, distractors 260 are generated, when similar questions 250 are being generated for a given question 204 that is a single choice question, a multiple-choice question, or a fill-in-the-blank question.

In another example, similar questions 250 are generated for a given subjective question 204. So, the similar question 250 is also a subjective question. Such subjective questions do not have one or more answers to select from. However, the similar questions generated 250 may be converted to objective questions either single choice or multiple choice. In such cases also distractors 260 are generated.

Questions are of various types. For example, single choice question, multiple choice question, fill in the blank question. The single choice question where one correct option has to be selected out of a few options. The multiple-choice question where more than one correct option need to be selected from a few options provided as possible answers to the question. The fill-in-the-blank question is one where a single word or phrase, needs to be entered and a numerical blank where a single number needs to be entered. For all types of questions where a set of options are provided to the user, the distractor generator generates distractors 260 that are possible alternative answers that are close enough to the correct answer or possible answers mistaken to be the correct answer(s) within predetermined constraints. Experts specify a pool of possible distractor generation rules and when generating the question, the distractor generator picks from this pool. For instance, for a single choice question, with only one correct option and three incorrect options, the distractor generator picks three rules from a pool of N expert-provided distractor rules. One rule may be "multiply the number by a constant c" for example. Another rule may be "replace the units or dimensions A of the option with units or dimensions B", for example. These are exemplary rules and a plurality of rules may be generated by experts in the subject or domain to which the question belongs. Distractor rules are also set by experts to check a student's competencies—for instance, if there is a question that requires the computation of the least common multiple (LCM) of two numbers for the solution, the greatest common divisor (GCD) of the two numbers may be given as a distractor 260. This selection of related concepts for distractor generation may be done using the information available from the Knowledge Graph.

Similar question generation module or question instance generation module or specific question generation module 220: Referring now again to FIG. 2, the system 200 includes specific question instance generation module 220. The question instance generation module 220 includes modules for entity replacement 220-A, attributes replacement 220-B, values replacement 220-C, and paraphrasing 220-D. At this point, the system 200 has generated a template and step-by-step solutions 255 for the given template. The following approach instantiates multiple questions given the template using eTSL, by passing a valid set of entities, attributes, and values.

Entity Replacement 220-A: With domain knowledge and using natural language processing techniques, entities can be interchangeably used. For instance, considering the same example of sentence A as described above, the entity "car" can be replaced with another entity of the same entity type, for example, "bus".

Attributes Replacement 220-B: With domain knowledge, using information from the knowledge graph about concept relations, and using natural language processing techniques, original attributes can be replaced with related ones. For example, in sentence A, the attribute "velocity" of the car can be replaced with "speed".

Values Replacement 220-C: Using the constraints identified for the template, each concept and relationship is assigned specific values that do not violate set constraints.

Paraphrasing 220-D: Natural language generation techniques are used to reconstitute parts of the template into other linguistic forms with the same semantics and meaning but with different syntax and grammatical structures.

FIG. 6-A and FIG. 6-B show exemplary screenshots 600-A and 600-B showing generation of a specific question using entry, attribute, and value replacer and question paraphrasing, respectively in accordance with an embodiment of the present disclosure. Referring to FIG. 6-A, a screenshot 600-A for generating a specific question utilizing entry, attribute, and value replacer is illustrated.

Question generation: At this point, the system 200 has generated a template and step-by-step solutions 255 for the given template. The following approach instantiates multiple similar questions 250, given the template, using the eTSL compiler module 215, by passing a valid set of entities, attributes and values.

Entity Replacement: With domain knowledge and using natural language processing techniques, entities can be interchanged. For instance, in sentence A, the entity car can be replaced with another entity of the same entity type, for example bus.

Attributes Replacement: With domain knowledge, using information from the knowledge graph about concept relationships and using natural language processing techniques, original attributes may be replaced with related ones. For example in sentence A, the attribute velocity of the car can be replaced with speed.

Value Replacement: Using the constraints identified for the template, each concept and relationship is assigned values that do not violate set constraints.

Paraphrasing: Referring to FIG. 6-B, an exemplary screenshot 600-B showing the generation of the question using the question paraphrasing module is illustrated. The paraphrasing module implements natural language generation to reconstitute parts of the template into other linguistic forms with the same semantics and meaning but with different syntax and grammatical structures.

Figure 7:
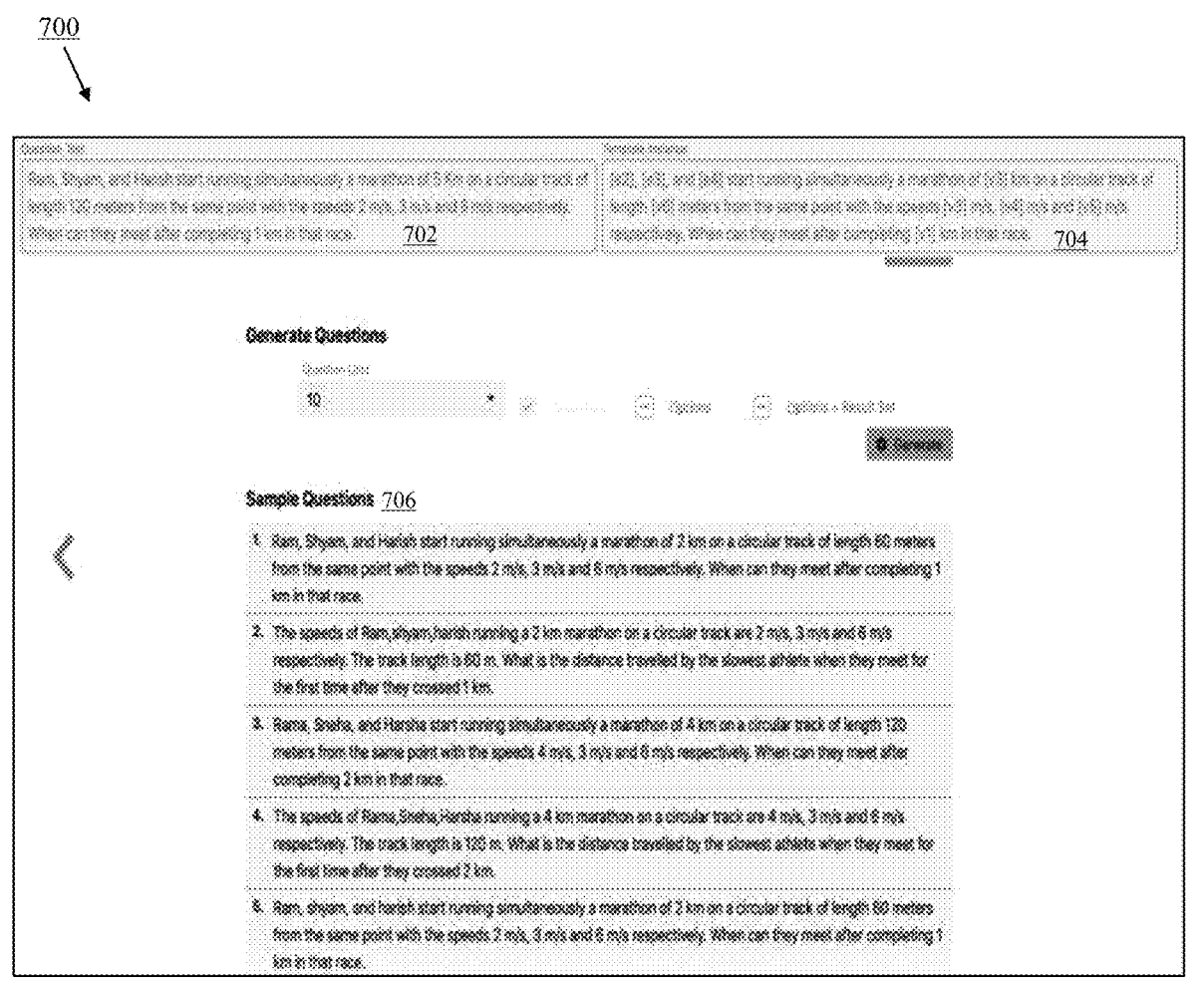

FIG. 7 is an exemplary screenshot 700, showing the similar questions 250 generated for the given question 204, using the template instance, respectively in accordance with an embodiment of the present disclosure. Referring to screenshot 700, the given question 204 is shown in the question text 702. The template instance 704 illustrates the one or more entities such as [e2], [e3] and [e4], one or more values such as [v3], [v4], [v5], [v6], and [v1]. The sample questions 706, illustrate the similar questions 250, generated using the template created.

Figure 8:
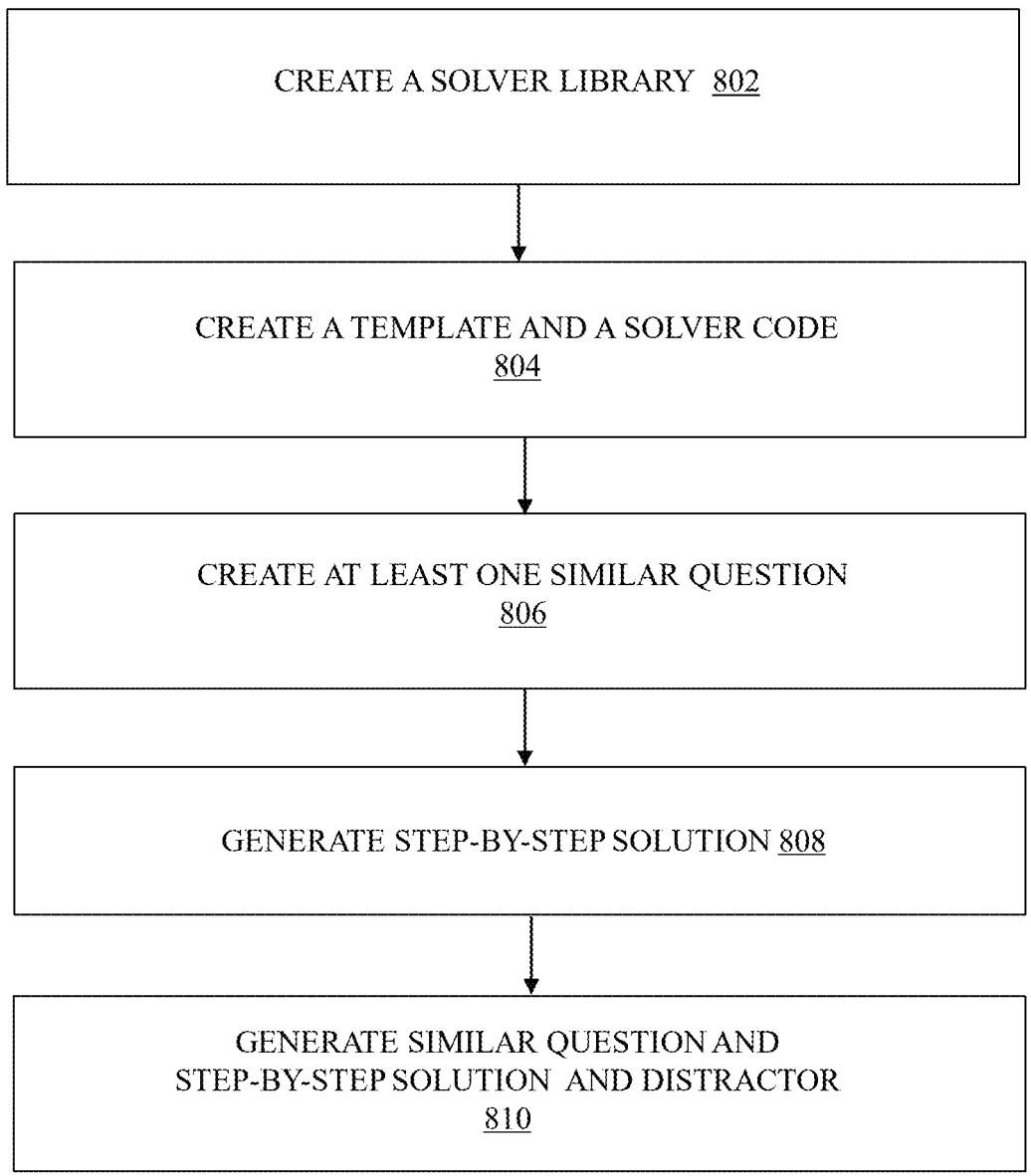
FIG. 8 is a flow chart illustrating a method for creating a template of a question, based on a given question, for generating a number of similar questions and generating their solutions.

FIG. 8 is a flow chart illustrating a method 800 for generating at least a question, similar to a given question, and a step-by-step solution for the given question and the at least one similar question. FIG. 8 may be described from the perspective of a processor that executes computer readable instructions stored in a memory, to which the processor is communicatively coupled, to carry out the functions of the modules (described above in FIG. 1) of the system 100. In particular, the steps as described in FIG. 8 may be executed for creating a template of question, based on the given question, for generating the number of similar questions and generating their solutions. Each step is described in detail below.

At step 802, a solver library is created. The solver library acts as a general resource of database for template creation, similar question generation and the step-by-step solution generation. The solver library comprises data associated with the collections of computer executable instructions or program for one or more solvers, wherein the solvers are defined for a plurality of concepts of the knowledge graph.

In one example, the creation of the solver library includes the use of the knowledge graph and the data associated with the concept mastery. The knowledge graph is prepared for an academic syllabus. The data associated with concept mastery of students may include mastery of the students on the concepts of knowledge graphs to understand what concepts or paths in the knowledge graph is mastered or not. This data may be used for creating the solver library. In one example, the solver library is developed by software developers, which implements solvers, which are functions to transform input into output. The solvers in the solver library are mapped with concepts of knowledge graph.

The solvers may be of two types: a construct and a decorator. A construct implements a mathematical equation or a function and takes input variables and converts it into an output. A decorator facilitates interactions with and among solvers. Decorators provide flexibility for additional functionalities such as sort, limit, range, conversion, extend list, etc., and are used in conjunction with existing constructs. The solvers stored in the solver library are required for computing and generating the step-by-step solution for the given question and the at least one similar question.

At step 804, a template representing the given question is created. In one example, a template may be created. The template is created by implementing natural language processing techniques and performing steps of identification of one or more entities and recognition of relationships between them, identification of one or more attributes of each of the one or more entities, and identification of one or more values of each of the identified attributes. The template is created representing the given question by setting up constraints on the values of the identified attributes using domain knowledge rules.

For example, for creating the template, representing the given question, natural language processing techniques is applied to input questions and entities, attributes, and values are extracted from it. The template is created, representing the given question (where the given question is the input question) by setting constraints on entities and/or attributes and values.

At this step, 804, one or more solver codes are also created, using solvers stored in the solver library. These solver codes are required for computing and generating the step-by-step solution for the given question and the at least one similar question. In one embodiment, the one or more solver codes are created by implementing one or more AI models. In another embodiment, the one or more solver codes are created manually by a programmer who is an expert.

In one example, for the given question and the solver library, the AI model is configured and trained such that, it may automatically predict the solver code. This solver code which is created or predicted may be used as input to the compiler module. The compiler is configured to create a computational graph from the solver codes. In one example, the solver codes created, comprise one or more solvers arranged in their sequence of execution, required for computing and generating the step-by-step solution for the given question and the at least one similar question.

At step 806, using the template created, at least the similar question is generated. At this step, 806, at least one question similar to the given question is generated, using the template created by replacing at least one value of at least one attribute in the template.

In one example, the at least one question similar to the given question is generated using natural language generation techniques by replacing one or more of the one or more entities identified and the one or more attributes identified, or both, with a semantically equivalent entity through the use of domain knowledge rules.

In one example, the at least one question similar to the given question is generated by replacing one or more attributes and values of attributes, based on the constraints set, using the domain knowledge rules.

In one example, the at least one question similar to the given question is generated by using natural language generation techniques after paraphrasing the template; wherein paraphrasing comprises reconstituting parts of the template into other linguistic forms with the same semantic meaning by changing one or more of syntax and grammatical structure of the given question.

Thus, the similar question is a specific question generated by replacing the entities and/or attributes and/or values by adhering to the constraints defined in the template. In one example, paraphrasing can also be done to make it linguistically different from the original given question.

At step 808, the step-by-step solution for the given question and the and the at least one similar question is generated. For generating the step-by-step solution, computational graph is created from the one or more solver codes. In other words, one or more solver codes associated with the created template are compiled to create the computational graph. At this step, the computational graph is executed for generating the step-by-step solution to the given question and the at least one similar question.

The step-by-step solution is generated based on abstraction for determining one or more nodes in the computational graph of the one or more solver codes to be expanded into the step-by-step solution, and personalization for identification of the solver code to be used, from the one or more solver codes created, based on ranking of the solver codes using factors associated with user's concepts mastery and learning goal.

Thus, the computational graph is executed with abstraction settings, which either expand a step or choose to not expand. The personalization settings associated with the computational graph allow the eTSL compiler to choose specific solver code among the one or more solver code depending upon the student's concept mastery. At this step, validation is performed to check if the output generated by the execution of the computational graph matches the expected output of a question. Thus, compiler module is configured for checking a correctness of the template and the solver code by comparing the step-by step solutions generated and a solution provided by a human expert.

At step 810, the step-by-step solution generated for the given question is written in a human-readable manner using eTSL compiler. At this step, the distractors are generated using domain knowledge rules or AI model. The distractors are generated for the given question based on predefined distractor generation rules set by a one or more experts. At this step, the similar question generated at step 806, and the step-by-step solution generated at step 808, and the distractors generated at step 810, are grouped together to form the package of the similar question along with their step-by-step solution, and the multiple-choice form of this generated question using distractors.

Thus, the disclosed system 100 and the method 800 facilitates the automatic generation of a numerous similar questions along with their step-by-step solutions, based on a given question, using the multi-step approach of solver library creation, template creation, eTSL compiler step-by-step solution generation and specific question generation.

Figure 9:
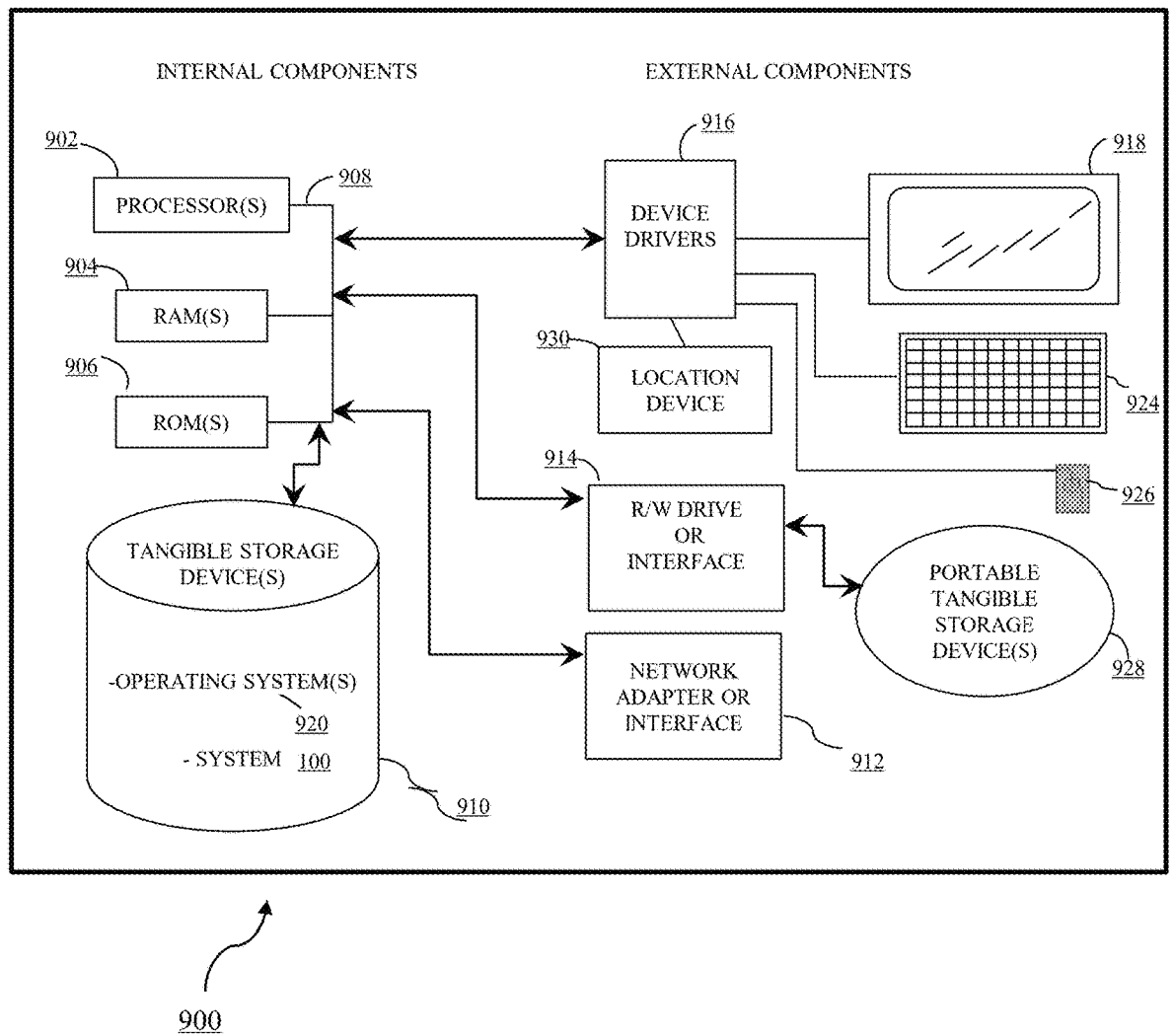
FIG. 9 is a block diagram for of a computing device utilized for implementing the system of FIG. 1 and the system FIG. 2, implemented according to an embodiment of the present disclosure.

FIG. 9 is a block diagram 900 for of a computing device utilized for implementing the system 100 of FIG. 1 and the system 200 FIG. 2 implemented according to an embodiment of the present disclosure. The modules of the system 100 and 200 described herein are implemented in computing devices. The computing device 900 comprises one or more processor 902, one or more computer readable memories 904 and one or more computer readable ROMs 906 interconnected by one or more buses 908.

Further, the computing device 900 includes a tangible storage device 910 that may be used to execute operating systems 920 and modules existing in the system 100. The various modules of the system 100 can be stored in tangible storage device 910. Both, the operating system and the modules existing in the system 100 are executed by processor 902 via one or more RAMs 904 (which typically include cache memory).

Examples of storage devices 910 include semiconductor storage devices such as ROM 906, EPROM, EEPROM, flash memory, or any other computer readable tangible storage devices 910 that can store a computer programs and digital data. Computing device also includes R/W drive or interface 914 to read from and write to one or more portable computer-readable tangible storage devices 928 such as a CD-ROM, DVD, and memory stick or semiconductor storage device. Further, network adapters or interfaces 912 such as a TCP/IP adapter cards, wireless WI-FI interface cards, or 3G or 4G wireless interface cards or other wired or wireless communication links are also included in the computing device 900. In one embodiment, the modules existing in the system 100 can be downloaded from an external computer via a network (for example, the Internet, a local area network or other, wide area network) and network adapter or interface 912. Computing device 900 further includes device drivers 916 to interface with input and output devices. The input and output devices can include a computer display monitor 918, a keyboard 924, a keypad, a touch screen, a computer mouse 926, or some other suitable input device.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The invention claimed is:

1. A system for generating at least one question, similar to a given question, the system comprising a processor communicatively coupled to a memory, wherein the memory is loaded with a plurality of modules of computer readable instructions for the processor to read and execute the instructions, wherein the modules are configured as:
a template creation module configured for creating a template representing the given question, wherein the template is created by implementing natural language processing techniques and performing steps of:
identification of one or more entities and recognition of relationships between the one or more entities,
identification of one or more attributes of each of the one or more entities, and
identification of one or more values of each of the identified attributes;
a similar question generation module for generating at least one question similar to the given question, wherein the at least one question is similar to the given question in content and assessment type but is not identical, using, the template created and by replacing, at least one value of at least one attribute in the template based on domain knowledge rules, wherein the template created is configured to be associated with one or more solver codes, wherein each solver code corresponds to a different method of solving the given question, wherein the one or more solver codes are created using solvers defined and stored in a solver library, wherein the solver library comprises data associated with collections of computer executable instructions or programs for the one or more solvers, wherein the solvers are created for a plurality of concepts of knowledge graph, wherein the knowledge graph is an arranged topology of a plurality of interlinked nodes, wherein each of the plurality of interlinked nodes represents a concept; and wherein the one or more solver codes are required for computing and generating a step-by-step solution for the given question and the at least one similar question; and
a compiler module configured for:
creating a computational graph by compiling the one or more solver codes associated with the template created; and
executing the computational graph, for generating the step-by-step solution to the given question and the at least one similar question, wherein the step-by-step solution generated from the computational graph is an ordered list of steps to be executed, where each step is an ordered list of sub steps.

2. The system of claim 1, wherein the template creation module is configured for creating the template representing the given question by setting up constraints on the one or more values of the identified attributes through the use of domain knowledge rules.

3. The system of claim 1, wherein the similar question generation module is configured for generating the at least one similar question using natural language generation techniques by replacing one or more of the one or more entities identified and the one or more attributes identified, or both, with a semantically equivalent entity through the use of domain knowledge rules.

4. The system of claim 1, wherein the similar question generation module is configured for generating the at least one similar question by replacing one or more attributes and one or more values of attributes, based on the constraints set, using the domain knowledge rules.

5. The system of claim 1, wherein the similar question generation module is configured for generating the at least one similar question using natural language generation techniques after paraphrasing the template, and wherein the paraphrasing comprises reconstituting parts of the template into other linguistic forms with the same semantic meaning by changing one or more of syntax and grammatical structure of the given question.

6. The system of claim 1, wherein creating the one or more solver codes is by implementing one or more AI models and human expert, required for generating the step-by-step solution for the given question and the at least one similar question.

7. The system of claim 1, wherein the solver codes created, comprise one or more solvers arranged in their sequence of execution, required for generating the step-by-step solution for the given question and the at least one similar question.

8. The system of claim 1, wherein generating the step-by-step solution is based on:
- abstraction for determining one or more nodes in the computational graph of the one or more solver codes to be expanded into the step-by-step solution, and
- personalization for identification of the solver code to be used, from the one or more solver codes created, based on ranking of the solver codes using factors associated with one or more of a user's concepts mastery and learning goal.

9. The system of claim 1, wherein the compiler module is configured for checking a correctness of the template and the solver code by comparing the step by step solutions generated and a solution provided by a human expert.

10. The system of claim 1, wherein the template creation module is configured for assigning metadata to the given question and the template created, by using a combination of syntactic and semantic features and AI models.

11. The system of claim 10, wherein assigning the metadata to the template created enables transferring the assigned metadata to:
- each similar question generated; and
- a step-by-step solution generated.

12. The system of claim 1, comprising a solution generation module, wherein the solution generation module comprises distractor generator module configured for generating at least one distractor for the given question based on predefined distractor generation rules set by one or more experts.

13. A method for generating at least one question similar to a given question, wherein the at least one question is similar to the given question in content and assessment type but is not identical, the method implemented by a computing device that includes a processor coupled to a memory, the method comprising:
- storing a plurality of modules in the memory and performing the steps of the method for generating at least one question similar to a given question, wherein the method steps comprise:
  - creating a template representing the given question, wherein the template is created by implementing natural language processing techniques and performing steps of:
    - identification of one or more entities and recognition of relationships between the one or more entities,
    - identification of one or more attributes of each of the one or more entities, and
    - identification of one or more values of each of the identified attributes;
  - generating at least one question similar to the given question, using the template created by replacing at least one value of at least one attribute type in the template based on domain knowledge rules, wherein the template created is configured to be associated with one or more solver codes, wherein each solver code corresponds to a different method of solving the given question, wherein the one or more solver codes are created using solvers stored in a solver library, wherein the solver library comprises data associated with collections of computer executable instructions or programs for the one or more solvers, wherein the solvers are created for a plurality of concepts of knowledge graph, wherein the knowledge graph is an arranged topology of a plurality of interlinked nodes, wherein each of the plurality of interlinked nodes represents a concept; and wherein the solvers are required for generating a step-by step solution for the given question and the at least one similar question; and
  - creating a computational graph by compiling the one or more solver codes associated with the template created and executing the computational graph, for generating the step-by-step solution to the given question and the at least one similar question, wherein the step-by-step solution generated from the computational graph is an ordered list of steps to be executed, where each step is an ordered list of sub steps.

14. The method of claim 13, comprising creating the template representing the given question by setting up constraints on the one or more values of the identified attributes through the use of domain knowledge rules.

15. The method of claim 13, wherein generating the at least one similar question:
- using natural language generation techniques by replacing one or more of the one or more entities identified and the one or more attributes identified, or both, with a semantically equivalent entity through the use of domain knowledge rules;
- replacing one or more attributes and values of attributes, based on the constraints set, using the domain knowledge rules; and
- using natural language generation techniques after paraphrasing the template; wherein paraphrasing comprises reconstituting parts of the template into other linguistic forms with the same semantic meaning by changing one or more of syntax and grammatical structure of the given question.

16. The method of claim 13,
wherein creating the one or more solver codes is by implementing one or more AI models, required for computing the step-by-step solution for the given question and the at least one similar question.

17. The method of claim 16,
wherein generating the step-by-step solution is based on:
- abstraction for determining one or more nodes in the computational graph of the one or more solver codes to be expanded into the step-by-step solution, and
- personalization for identification of the solver code to be used, from the one or more solver codes created, based on ranking of the solver codes using factors associated with user's concepts mastery and learning goal.

* * * * *